Jan. 27, 1959    P. C. SMITH    2,871,046
RESILIENT LOCKING COUPLING
Filed Nov. 28, 1956
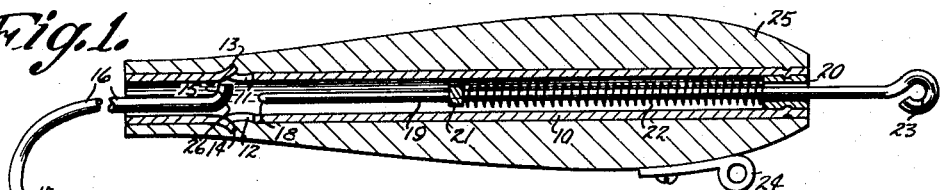
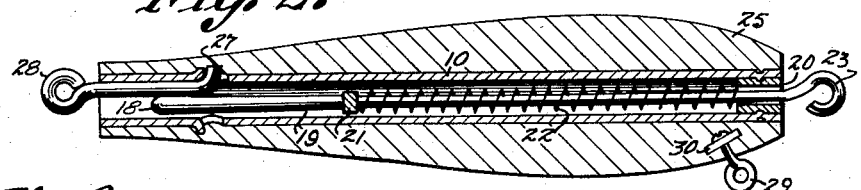
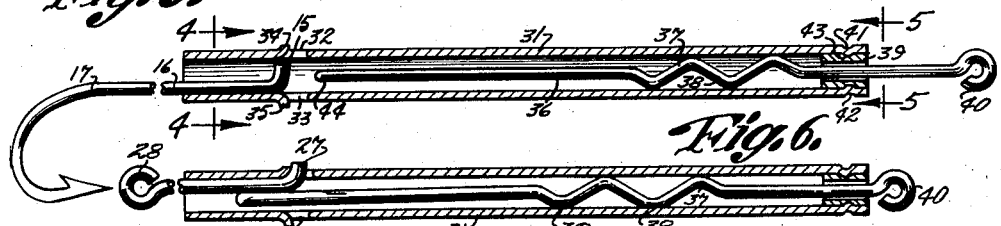
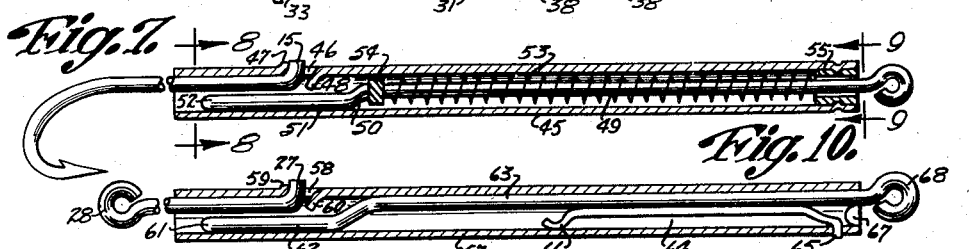
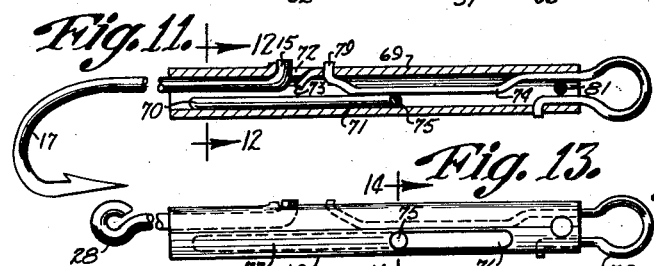
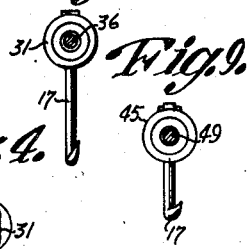
INVENTOR.
Peter C. Smith.
BY Victor J. Evans & Co.
ATTORNEYS United States Patent Office 2,871,046
Patented Jan. 27, 1959

2,871,046

RESILIENT LOCKING COUPLING

Peter C. Smith, Perth Amboy, N. J.

Application November 28, 1956, Serial No. 624,921

1 Claim. (Cl. 287—103)

This invention relates to couplings for fishing lures of the type having a removable hook or hooks mounted to be released from a lure, and in particular a coupling having an elongated eliptical-shaped channel with openings in one or both edges thereof and with projections on the ends of shanks of hooks adapted to be locked in said openings with a resiliently held locking pin having a cam-shaped end.

This application is a continuation in part of my co-pending applications, one filed September 25, 1956, Serial No. 611,953 including the fish hook retaining elements in combination with an arcuate spoon and another filed November 20, 1956, with the Serial Number 623,331, and including an enlarged spring barrel and sliding pin locating washer in the large end of the barrel, which parts are eliminated in this application.

The purpose of this invention is to provide a coupling adapted to be installed in a fishing lure in which a hook is readily locked in the coupling and also in which the hook may readily be removed for removing a fish from a lure.

Various types of mountings have been provided for hooks on fish lures and where hooks are removable from the lures tools are required for separating the hook from the lure and also for reinstalling the hook in the lure and the use of tools in a boat while fishing is objectionable. With this thought in mind this invention contemplates a removable hook mounting wherein it is only necessary to press a hook into the end of a lure or into an opening in the body of a lure to permanently install and lock the hook in position in the lure for fishing.

The object of this invention is, therefore, to provide a removable mounting for a hook in a fish lure wherein the hook is snapped into locking position by a resiliently actuated cam as it is pressed into an opening in the body of the lure.

Another object of the invention is to provide a coupling for a removable hook of a fish lure in which the hook is readily released by drawing a pin from a portion of the lure.

A further object of the invention is to provide a coupling for mounting hooks in fish lures in which the device is of a simple and economical construction.

With these and other objects and advantages in view the invention embodies an elongated channel or tubular casing eliptical-shaped in cross section having openings in one or both of the edges thereof with a resiliently mounted pin having a cam-shaped end and a hook having a shank with a projection on the end wherein with the hook inserted in the channel the cam-shaped end of the pin forms a guide directing the projection on the shank of the hook into one of the openings in the edge of the channel whereby the hook is locked in the channel and with the channel installed in a fishing lure or plug a complete hook mounting is provided.

Other features and advantages of the invention will appear from the following description taken in connection with the drawing, wherein:

Figure 1 is a longitudinal section through a fishing lure with a coupling tube extended longitudinally therethrough and illustrating the position of a hook and a resiliently held pin as the hook is inserted in the channel of the tube in the body of the lure.

Figure 2 is a view similar to that shown in Fig. 1 showing the shank of an eye, similar to the shank of the fish hook, locked in the lure with the pin retaining a projection on the end of the shank in an opening in one edge of the tube.

Figure 3 is a longitudinal section through the coupling illustrating a modification wherein the pin on the end of which the cam is positioned is formed with offset sections for resiliently retaining the pin in position in the channel of the tube.

Figure 4 is a cross section through the end of the coupling shown in Fig. 3 being taken on line 4—4 thereof.

Figure 5 is a section looking toward the opposite end of the coupling taken on line 5—5 of Fig. 3.

Figure 6 is a longitudinal section similar to that shown in Fig. 3 showing the shank of an eye locked in an opening of the tube.

Figure 7 is a longitudinal section through a coupling similar to that shown in Fig. 2 illustrating a further modification wherein one end of the pin is offset to facilitate guiding a projection on the end of the shank of a hook or eye into an opening of the tube.

Figure 8 is a cross section through the coupling shown in Fig. 7 being taken on line 8—8 thereof.

Figure 9 is a cross section taken on line 9—9 of Fig. 8 also showing the location of the pin, the opposite end of which retains a projection on the shank of a hook in an opening of the lure.

Figure 10 is a longitudinal section through the tube of a lure showing a further modification wherein a pin having an offset section therein is resiliently held by a spring positioned in a channel of the tube.

Figure 11 is a longitudinal section through a lure illustrating a further modification wherein a projection on the shank of a fish hook is locked in an opening in the side of a tube of the lure with a pin secured in position by a key.

Figure 12 is a cross section through the lure taken on line 12—12 of Fig. 11 showing the relative positions of the shank in the fish hook and pin forming the latch or lock.

Figure 13 is a side elevational view of the coupling shown in Fig. 11.

Figure 14 is a cross section taken on line 14—14 of Fig. 13 also showing the mounting of the locking pin in the channel or tube.

Referring now to the drawing wherein like reference characters denote corresponding parts the improved resilient coupling of this invention, as illustrated in Figs. 1 and 2, includes a body which is eliptical-shaped in cross section providing a casing or tube having an open channel extended therethrough and the tube is provided with openings 11 and 12 from which arcuate tongues 13 and 14 extend and the openings are positioned to receive a projection 15 on the end of a shank 16 of a hook 17 with the projection urged into one of the openings 11 or 12 with a cam 18 on the end of a pin 19, the pin being slidably mounted in a bushing 20 in the end of the tube 10 and having a collar 21 on the intermediate portion and positioned to engage one end of a spring 22 positioned between the collar 21 and bushing 20. The outer end of the pin 19 is provided with an eye 23 and a line attaching eye 24 is positioned on the outer surface of a plug or lure 25 in which the tube 10 is mounted.

As illustrated in Fig. 1 the shank 16 of a fish hook is inserted in the open end of the tube or channel and as the shank moves into the channel an arcuate surface 26 of the projection 15 engages the cam 18 of the pin 19 whereby the cam urges the projection into one of the openings 11 or 12 and with continued inward movement of the pin 19 the pin slides into the lower part of the channel with the shank 16 retained in the upper part and with the projection 15 in the opening 11. By this means the projection 15 or a similar projection 27 of an eye 28 is locked in one of the openings in the wall of the tube by the cam 18 or pin 19 and the hook remains locked in the coupling until the pin 19 is withdrawn by the eye 23. In withdrawing the pin the hook is released as soon as the cam 18 passes the openings 11 and 12 whereby the projection 15 is free to drop from the opening and thereby release the hook or eye.

The lure illustrated in Fig. 2 is similar to the lure shown in Fig. 1 except that the eye 24 is replaced with an eye 29 the shank of which is retained by a collar 30 in the body of the lure.

In the design illustrated in Figs. 3 to 6 inclusive the coupling having a tube 31, similar to the tube 10 and having openings 32 and 33 with lips or tongues 34 and 35 is provided with a pin 36 having oppositely disposed offset sections 37 and 38 that frictionally engage the inner surface of the tube 31 for preventing free movement of the pin and for retaining the pin in a released position, as shown in Fig. 3 or in a locking position as shown in Fig. 6. The pin 36 extends through an opening in a bushing 39, similar to the bushing 20 and the outer end is provided with an eye 40 by which the pin is manually actuated. The bushing 39, similar to the bushing 20 is retained in the end of the tube by crimping portions 41 and 42 thereof into indentations 43 in the surface of the bushing. By this means, spring, inherent in the pin 36 frictionally retains the pin in position whereby the cam 44, similar to the cam 18, guides the projection 15 of the fish hook into one of the openings 32 or 33 and wherein the continued inward movement of the pin locks the projection in an opening, as shown in Fig. 6.

In Fig. 7 an eliptical-shaped tube 45, which is provided with a single opening 46 having a lip 47 extended outwardly and a tongue 48 extended inwardly is provided with a pin 49 having an offset section 50 from which an end portion 51 with a cam 52 on the end thereof extends and a spring 53 extended around the pin and positioned between a collar 54 and a bushing 55 urges the cam 52 into engagement with the shank of a hook or eye and thereby guides the projection 15 of a hook into the opening 46, as shown. The outer end of the pin is provided with an eye 56 by which the pin is withdrawn to release the hook.

In the design illustrated in Fig. 10 an eliptical-shaped tube 57, also similar to the tube 10 and provided with a single opening 58 having a lip 59 on the upper side and a tongue 60 extended inwardly is illustrated, and it will be noted that the projection 27 of an eye 28 is urged into the opening by a cam 61 on an offset portion 62 of a pin 63 which is resiliently held in the tube by a spring 64 whereby the body of the pin is positioned in one side of the tube whereas the portion 62 is positioned in the opposite side. In this design one end of the spring 64 is anchored in an opening in the tube as shown at the point 65 and the opposite end 66 slides upon the inner surface of the tube. The pin 64 is retained in an upwardly disposed position with lugs 67 crimped inwardly from sides at the end of the tube and the end of the pin 63 is provided with an eye 68 by which the pin is moved longitudinally of the tube.

In the design illustrated in Figs. 11 and 13 a fish hook 17 or eye 28 is mounted in a tube 69 in which a cam 70 positioned on the end of an L-shaped member 71 locks the projection 15 of the hook in an opening 72 from which a tongue 73 extends and the member 71, which is resiliently held by a spring 74 is provided with an end 75, which is positioned at a right angle to the body of the member and which extends through a flap 76 in a side wall 77 of the tube 69. In this design the part 75 is manually actuated to force the projection on the shank of a hook or eye into the opening 72 with the member in the position shown in Figs. 11 and 13 and with the member 75 withdrawn the shank of the hook or eye are released.

The spring 74 is provided with a loop 78, one end 79 of which is anchored in an opening in the upper wall of the tube and the opposite end 80 is anchored in an opening in the lower wall of the tube. The spring member 74 is retained in position in the tube 69 by a rivet or pin 81.

With the parts assembled as illustrated and described fishing kits may be provided with a plurality of lures, plugs, spoons and the like and each kit may contain a plurality of hooks of different sizes whereby in fishing hooks may readily be removed from lures and replaced with hooks of different types or designs, or gang hooks may be attached to the eyes whereby the size of the hook may be changed to correspond with the sizes or type of fish being caught. Furthermore, after catching a fish the eye on the end of the locking pin may be withdrawn to reelase the hook so that the hook may be removed from the fish after the lure, with another hook positioned therein, is dropped into the water.

It will be understood that other modifications, within the scope of the appended claim, may be made in the design and arrangement of the parts without departing from the spirit of the invention.

What is claimed is:

In a fish lure coupling, the combination which comprises an elongated tapering body having a bore extended longitudinally therethrough, a sleeve, elliptical-shaped in cross section extended through the bore, the sleeve having oppositely disposed openings therein and said openings being spaced inwardly from the small end of the body, the openings being positioned in the edges of short radii of the sleeve, a rod having a round cam-shaped end extended into the sleeve from the end positioned in the large end of the body in which the sleeve is positioned, the rod having a collar thereon and said collar being positioned in the sleeve and intermediate of the ends thereof, a bushing in the end of the sleeve opposite to the end in which the oppositely disposed openings are positioned providing a bearing for the rod, the sleeve being crimped into recesses of the bushing for retaining the bushing in position in the end of the sleeve, a spring on the rod positioned between the collar of the rod and the bushing in which the rod is slidably mounted, and a fish hook shank, the end of which is positioned at an angle of 90° to the shank providing a right angular positioned projection extended into the end of the sleeve in which the oppositely disposed openings are positioned, the outer surface of the projection with the shank being arcuate, resiliency inherent in the rod permitting the round cam-like end or nose of the rod to be moved to one side of the sleeve providing an abutment against which the arcuate surface at the intersection of the shank and projection rides, the nose being positioned to provide a guide for directing the projection on the arcuate end of the shank into one of the oppositely disposed openings of the sleeve and also designed to be positioned between the shank and inner surface of the sleeve for locking the projection of the shank in one of the oppositely disposed openings of the sleeve.

References Cited in the file of this patent

UNITED STATES PATENTS

| | | |
|---|---|---|
| 2,208,017 | Crane | July 16, 1940 |
| 2,556,117 | Smith et al. | June 5, 1951 |
| 2,797,658 | Doty | July 2, 1957 |